(12) United States Patent
Bang et al.

(10) Patent No.: US 9,523,808 B2
(45) Date of Patent: Dec. 20, 2016

(54) THIN FILM TYPE BACK LIGHT UNIT FOR FLAT PANEL DISPLAY

(71) Applicants: LG Display Co., Ltd., Seoul (KR); Bayer MaterialScience AG, Leverkusen (DE)

(72) Inventors: Hyungseok Bang, Goyang-si (KR); Friedrich-Karl Bruder, Krefeld (DE); Thomas Peter Fäcke, Leverkusen (DE); Rainer Hagen, Leverkusen (DE); Günther Walze, Köln (DE)

(73) Assignees: LG DISPLAY CO., LTD., Seoul (KR); COVESTRO DEUTSCHLAND AG, Leverkusen (DE)

( * ) Notice: Subject to any disclaimer, the term of this patent is extended or adjusted under 35 U.S.C. 154(b) by 31 days.

(21) Appl. No.: 14/586,014

(22) Filed: Dec. 30, 2014

(65) Prior Publication Data
US 2015/0185393 A1 Jul. 2, 2015

(30) Foreign Application Priority Data
Dec. 31, 2013 (KR) .......... 10-2013-0168566

(51) Int. Cl.
*F21V 7/04* (2006.01)
*F21V 8/00* (2006.01)

(52) U.S. Cl.
CPC .......... *G02B 6/0023* (2013.01); *G02B 6/0055* (2013.01); *G02B 6/0065* (2013.01); *G02B 6/0026* (2013.01); *G02B 6/0035* (2013.01)

(58) Field of Classification Search
CPC ... G02B 6/0013; G02B 6/0015; G02B 6/0023; G02B 6/0025; G02B 6/0026; G02B 6/0031; G02B 6/0035; G02B 6/005; G02B 6/0055; G02B 6/0065; G02B 27/0103; G02B 27/0105; G02B 27/0107
See application file for complete search history.

(56) References Cited

U.S. PATENT DOCUMENTS 5,745,266 A * 4/1998 Smith ............... B60Q 1/30
                                          359/13
2004/0062502 A1* 4/2004 Levola ............... G02B 5/1866
                                          385/129
(Continued)

FOREIGN PATENT DOCUMENTS

CN 1685291 A 10/2005
CN 1957269 A 5/2007
(Continued)

*Primary Examiner* — Peggy Neils
*Assistant Examiner* — Alexander Garlen
(74) *Attorney, Agent, or Firm* — Dentons US LLP (57) ABSTRACT

Disclosed is a flat panel display device having a display panel and a back light unit in which the back light unit may, for example, include a base film having a width and a length and including a high refractive film and a low refractive film on the high refractive film; a first incident pattern at a one side of a first surface of the base film; a reflective pattern on the first surface of the base film at an opposite side spaced apart from the one side with a distance substantially corresponding to the length of the first surface of the base film and substantially covering the width of the first surface of the base film; a light radiating pattern on a second surface of the base film; and a light source spaced apart from the first incident pattern with a first focal length and providing an incident light to the first incident pattern.

9 Claims, 8 Drawing Sheets

(56) References Cited

U.S. PATENT DOCUMENTS

| | | | |
|---|---|---|---|
| 2006/0126179 A1* | 6/2006 | Levola | G02B 27/4277 359/563 |
| 2006/0221448 A1* | 10/2006 | Nivon | G02B 5/1814 359/572 |
| 2007/0070859 A1* | 3/2007 | Hirayama | G02B 5/32 369/112.04 |
| 2013/0051730 A1* | 2/2013 | Travers | G02B 27/01 385/37 |

FOREIGN PATENT DOCUMENTS

| | | |
|---|---|---|
| CN | 101151562 A | 3/2008 |
| CN | 100533208 C | 8/2009 |
| KR | 1020070119017 A | 12/2007 |

\* cited by examiner

THIN FILM TYPE BACK LIGHT UNIT FOR FLAT PANEL DISPLAY

CROSS-REFERENCE TO RELATED APPLICATIONS

This application claims the benefit of Korean Patent Application No. 10-2013-0168566, filed on Dec. 31, 2013, which is hereby incorporated by reference for all purposes as if fully set forth herein.

BACKGROUND OF THE INVENTION

Field of the Invention

The present invention relates to a flat panel display including a thin film type backlight unit and method for manufacturing the same. More particularly, the present invention relates to a flat panel display including an ultrathin film type and high efficiency backlight unit using a holography technology.

Discussion of the Related Art

Nowadays, due to the characteristics of lightweight, slim thickness, low consumption electric power, liquid crystal display devices (LCDs) are widely applied to various electronic devices. LCDs are applied to portable computers such as notebook PCs, office automation devices, audio/video devices, advertising display devices for indoor or outdoor uses, and so on. Transmissive type LCDs, which are the most widely used, represent images by modulating the luminescence of the light incident from the backlight unit by controlling the electric field applied to the liquid crystal layer.

Typically, there are two types of backlight units: direct type and edge type. The direct type backlight unit has a structure in which a plurality of optical sheets and a diffusion plate are stacked under the liquid crystal panel and a plurality of light sources are disposed under the diffusion plate.

Figure 1:
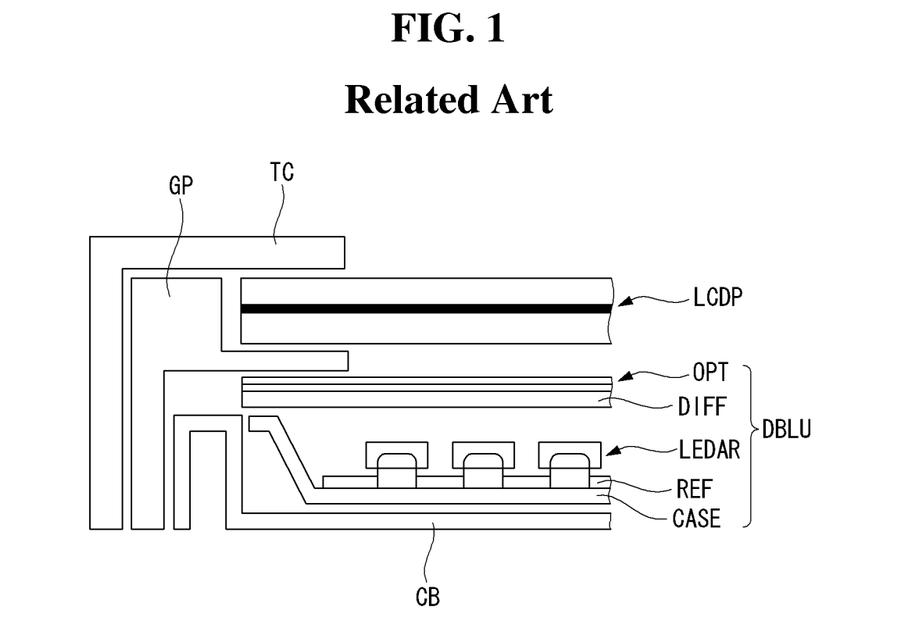
FIG. 1 is a cross-sectional view illustrating a structure of an liquid crystal display having a direct type backlight unit including an array of light emitting diodes as a light source according to the related art.

FIG. 1 is a cross-sectional view illustrating a structure of an LCD having a direct type backlight unit including an array of light emitting diodes (LED) as a light source according to the related art.

The direct type backlight unit DBLU includes a light source disposed under a liquid crystal panel LCDP and provides backlight directly to the liquid crystal panel LCDP. The light source may be a thin fluorescent lamp. Alternatively, as shown in FIG. 1, the light source may be an LED array LEDAR having a lower power consumption and enhanced luminescence.

The LED array LEDAR is disposed in a matrix configuration on the bottom surface of the case CASE. The case CASE may be installed at the cover bottom CB. In some cases, the case CASE may be omitted, and the LED array LEDAR may be disposed at the cover bottom CB directly. On the LED array LEDAR, a diffusion plate DIFF is disposed. The diffusion plate DIFF diffuses the backlight from the LED array LEDAR to provide evenly scattered backlight over the light incident surface of the liquid crystal panel LCDP. Between the diffusion plate DIFF and the liquid crystal panel LCDP, a plurality of optical sheets OPT may be disposed. The optical sheets OPT include one or more prism sheets, one or more diffusion sheets, and/or a dual brightness enhancement film (or DBEF). The prism sheets converse the scattered and/or diffused backlight by the diffusion plate DIFF to the liquid crystal panel LCDP for enhancing the brightness of the backlight. The diffusion sheets diffuse again the conversed backlight by the prism sheets over the liquid crystal panel LCDP to achieve evenly distributed luminescence.

A guide panel GP wraps and/or surrounds the side surfaces of the liquid crystal panel LCDP and the direct type backlight unit DBLU and supports the liquid crystal panel LCDP by inserting between the liquid crystal panel LCDP and the optical sheets OPT. The cover bottom CB wraps and/or surrounds the case CASE and the bottom surface of the direct type backlight unit. On the bottom surface of the case CASE having the LED array LEDAR, a reflective sheet REF is disposed to reflect the backlight leaked from the diffusion plate DIFF and/or the optical sheets OPT to the liquid crystal panel LCDP. The top case TP surrounds the upper edge of the liquid crystal panel LCDP and the side surface of the guide panel GP.

Meanwhile, the edge type backlight unit may have thinner thickness than the direct type backlight unit. Currently, LCDs have an LED light source rather than a fluorescent lamp. Especially, due to easy installation of the light source, the edge type backlight unit, in which LED light sources are disposed at the side surface of the liquid crystal panel, is more widely applied.

Hereinafter, the edge type backlight unit will be described in detail with reference FIG. 2.

Figure 2:
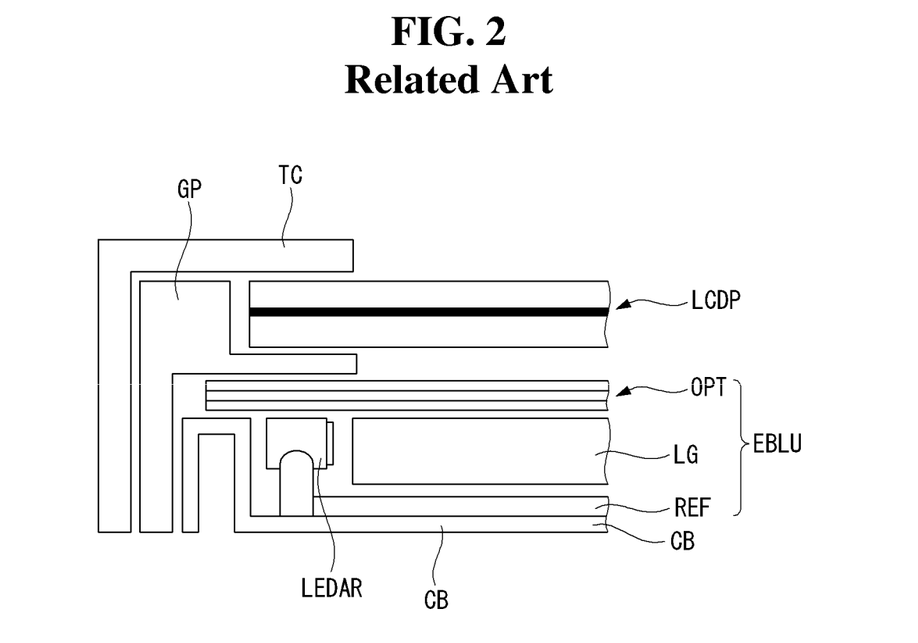
FIG. 2 is a cross-sectional view illustrating a structure of an liquid crystal display having an edge type backlight unit including an array of light emitting diodes as a light source according to the related art.

FIG. 2 is a cross-sectional view illustrating a structure of an LCD having an edge type backlight unit including an array of light emitting diodes as a light source according to the related art.

Referring to FIG. 2, the edge type backlight unit comprises a cover bottom CB, a light guide LG disposed at a bottom surface of the cover bottom CB, and a light source disposed between the side surface of the light guide LG and the cover bottom CB and providing backlight to the side surface of the light guide LG. The light source may be a thin fluorescent lamp. Alternatively, as shown in FIG. 1, the light source may be the LED array LEDAR having a lower power consumption and enhanced luminescence. The light source may be disposed at the side surface of the light guide LG using an installing means like housing. The light guide LG receives the backlight from the LED array LEDAR and refracts the direction of the backlight as being perpendicular to the light incident surface of the liquid crystal panel LCDP. Between the light guide LG and the liquid crystal panel LCDP, a plurality of optical sheets OPT are disposed. The optical sheets OPT include one or more prism sheets, and one or more diffusion sheets for scattering and/or diffusing the backlight from the light guide LG. To enhance the brightness and/or luminescence, the optical sheets OPT may further include a dual brightness enhancement film (or DBEF).

The guide panel GP wraps and/or surrounds the side surfaces of the liquid crystal panel LCDP and the edge type backlight unit, and supports the liquid crystal panel LCDP by inserting between the liquid crystal panel LCDP and the optical sheets OPT. Between the cover bottom CB and the light guide LG, a reflective sheet REF is disposed to reflect the backlight leaked from the diffusion plate DIFF and/or the optical sheets OPT to the liquid crystal panel LCDP. The top case TP surrounds the upper edge of the liquid crystal panel LCDP and the side surface of the guide panel GP.

LCDs, which are not a self-luminance display, typically have a backlight unit. A backlight unit can be configured to provide backlight evenly distributed over the whole surface of the liquid crystal panel. Therefore, various optical devices and/or means are used to transform light from a point light source or line light source to light from a plane light source.

Further, considering the optical characteristics and structures of these optical devices and/or means, the backlight unit would have some thickness. Even though flat type displays including LCDs are remarkably slimed than the conventional displays like cathode ray tubes (CRT), a new backlight unit suitable for a display device with slim profile and lower power consumption is in demand.

SUMMARY OF THE INVENTION

Accordingly, the present invention is directed to provide a flat panel display including a thin film type backlight unit and method for manufacturing the same that substantially obviates one or more problems due to limitations and disadvantages of the related art.

An advantage of the present invention is to provide a flat panel display with slim profile and lower power consumption.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, in a flat panel display device, having a display panel and a back light unit, the back light unit may, for example, include a base film having a width and a length and including a high refractive film and a low refractive film on the high refractive film; a first incident pattern at a one side of a first surface of the base film; a reflective pattern on the first surface of the base film at an opposite side spaced apart from the one side with a distance substantially corresponding to the length of the first surface of the base film and substantially covering the width of the first surface of the base film; a light radiating pattern on a second surface of the base film; and a light source spaced apart from the first incident pattern with a first focal length and providing an incident light to the first incident pattern.

In one embodiment, the back light unit further comprises a reflection layer covering the bottom surface of the base film excepting the incident pattern and the reflective pattern.

In one embodiment, the first incident pattern includes a holography pattern configured to convert the incident light into an expanded light, wherein the incident light perpendicularly enters onto a surface of the incident pattern, and wherein the expanded light has a refraction angle larger than a critical angle for total reflection at an interface between the high refractive film and the low refractive film, and is expanded corresponding to the width.

In one embodiment, the expanded light propagates to the reflective pattern through into the high refractive film.

In one embodiment, the reflective pattern includes a holography pattern configured to convert the expanded light into a collimated light which has a reflection angle smaller than the refraction angle and larger than a critical angle of total reflection at an interface between the low refraction film and an air, and covers the width.

In one embodiment, some portions of the collimated light are refracted by the light radiating pattern closed to a perpendicular direction to an upper surface of the base film, and are radiated outward from the low refractive film.

In one embodiment, the back light unit further comprises: a second incident pattern disposed on an upper surface of the base film as being facing with the first incident pattern, wherein the light source is apart from the second incident pattern with a second focal length, and provides the incident light to the second incident pattern.

In one embodiment, the first incident pattern is a holography pattern made with a short wavelength light of the incident light, and wherein the second incident pattern is a holography pattern made with a long wavelength light of the incident light.

In one embodiment, a distance difference between the first focal length and the second focal length is corresponding to a thickness of the base film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

Hereinafter, a flat panel display having a thin film type backlight unit according to the first embodiment of the present invention will be described with reference to FIG. 3.

Figure 3:
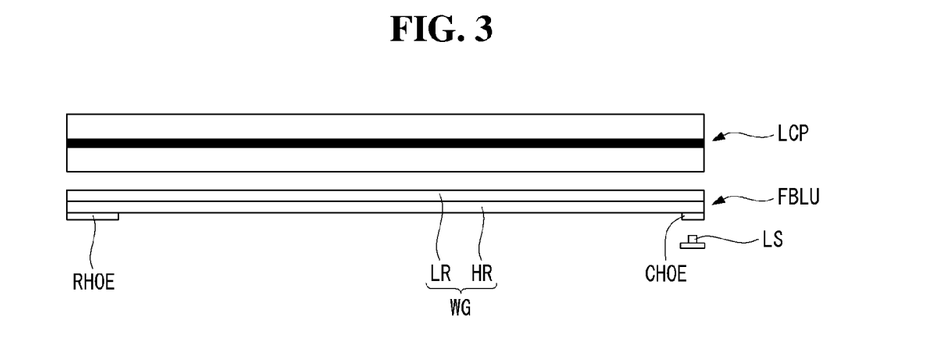
FIG. 3 is a cross sectional view illustrating a structure of a flat panel display including a thin film type backlight unit according to an embodiment of the present invention.

FIG. 3 is a cross-sectional view illustrating a structure of a flat panel display including a thin film type backlight unit according to an embodiment of the present invention.

Referring to FIG. 3, the flat panel display includes a flat display panel LCP such as a liquid crystal panel and a thin film type backlight unit FBLU disposed under the flat display panel LCP. Even though not shown in figures, the thin film type backlight unit FBLU and the flat display panel LCP may be assembled by a cover bottom, a guide panel and a top case as described with reference to the related art. The thin film type backlight unit will now be described in detail.

The thin film type backlight unit FBLU includes an ultrathin light guide film LGF. The upper (or front) large surface of the ultrathin light guide film LGF is facing with the back side of the flat display panel LCP. At both sides which are facing each other on the lower (or back) surface of the ultrathin light guide film LGF, one holography pattern is disposed, respectively. As the thickness of the ultrathin light guide film LGF is very thin, it may not be preferable that the light source LS is disposed at the side surface of the ultrathin light guide film LGF as in the case of the backlight unit according to the related art. In such a case, the light efficiency may be degraded.

According to an embodiment of the present invention, the light source LS is thus disposed at the lower (or back or rear) surface of the ultrathin light guide film LGF. The ultrathin light guide film LGF converts the light from the tiny surface light source LS such as light emitting diode into a large area surface light source corresponding to the surface of the ultrathin light guide film LGF, and supplies the large area surface light to the flat display panel LCP.

A structure of the ultrathin light guide film LGF will now be described in detail with reference to FIGS. 4 to 6.

Figure 4:
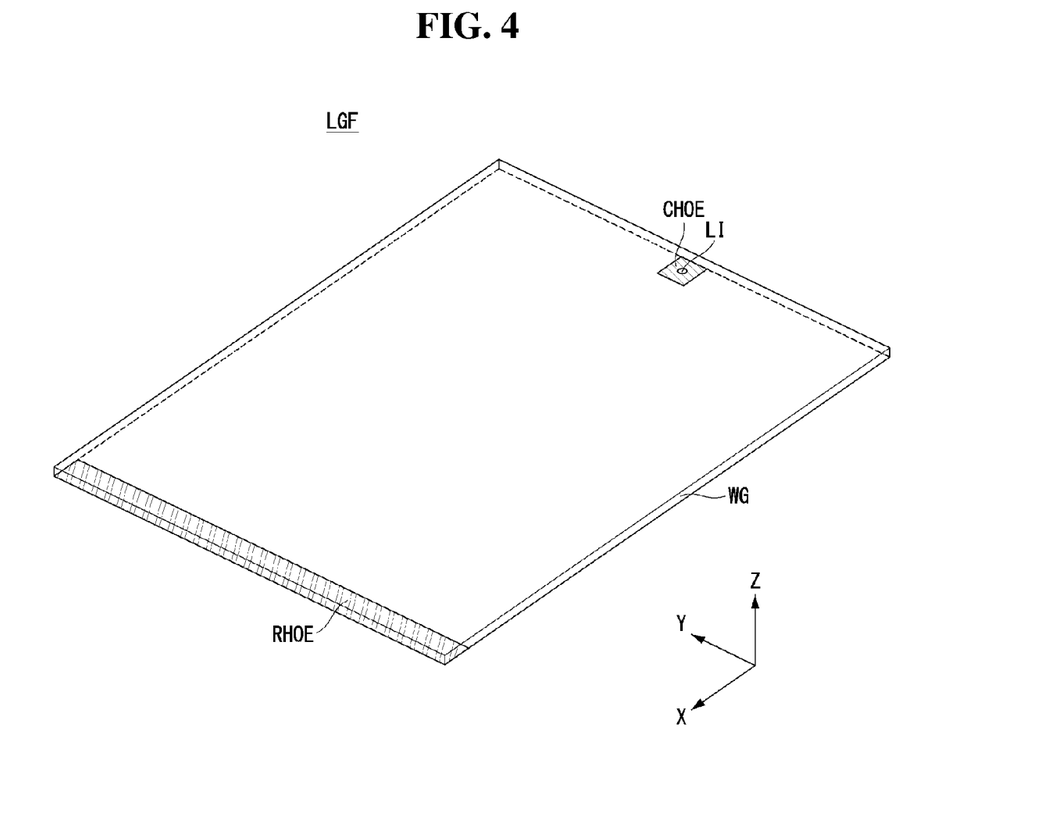
FIG. 4 is a perspective view illustrating a structure of an ultrathin light guide film according to the first embodiment of the present invention.

FIG. 4 is a perspective view illustrating a structure of an ultrathin light guide film according to the first embodiment of the present invention. FIG. 5 is a plan view illustrating a structure of the ultrathin light guide film illustrated in FIG. 4 according to the first embodiment of the present invention. FIG. 6 is an enlarged side view illustrating a structure of a thin film type backlight unit including the ultrathin light guide film illustrated in FIG. 4 according to the first embodiment of the present invention.

Figure 5:
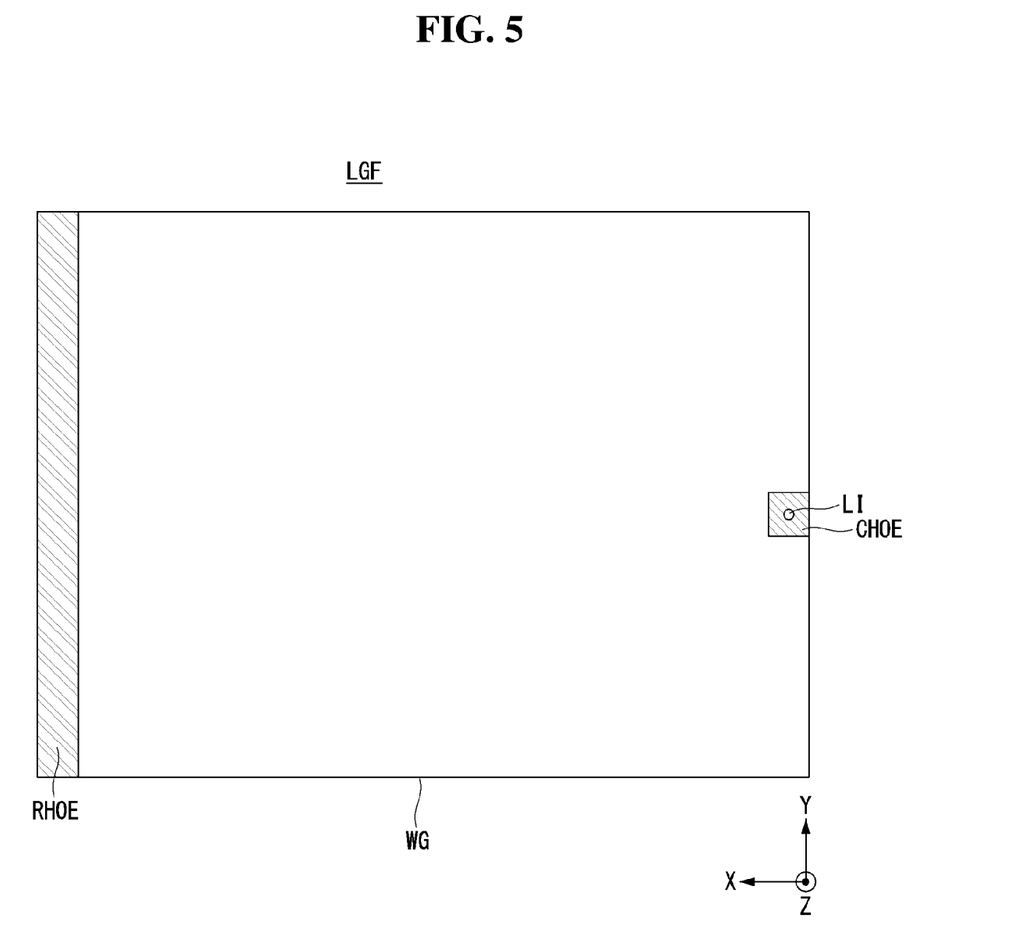
FIG. 5 is a plan view illustrating a structure of the ultrathin light guide film illustrated in FIG. 4 according to the first embodiment of the present invention.
Figure 6:
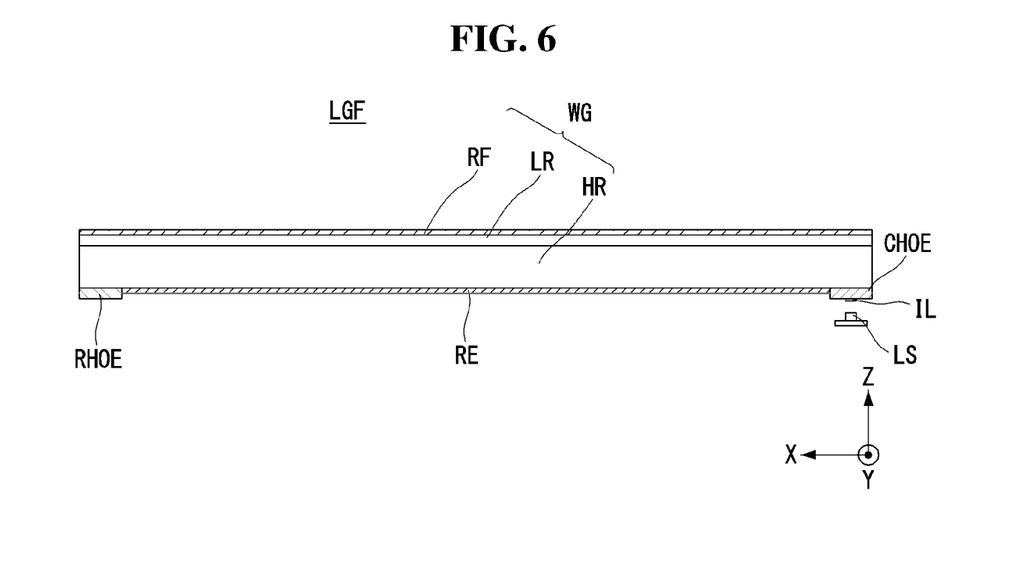
FIG. 6 is an enlarged side view illustrating a structure of a thin film type backlight unit including the ultrathin light guide film illustrated in FIG. 4 according to the first embodiment of the present invention.

Referring to FIGS. 4 to 6, the ultrathin light guide film LGF includes a base film WG for guiding the backlight, wherein the base film WG is a thin film type light guide media or a wave guide media. The base film WG may include a high refractive film HR and a low refractive film LR which are joined in surface and/or stacked each other. Especially, the low refractive film LR is stacked on the high refractive film HR. Here, the term 'on', 'upper', 'front' or 'upside' means the direction at which the backlight is finally radiated from the ultrathin light guide film LGF, that is, the direction toward the flat display panel LCP.

Further, on the upper surface of the low refractive film LR, a light radiating pattern RF may be included. For example, a light diffractive film may be attached or a light diffractive layer may be deposited on the upper surface of the low refractive film LR. Alternatively, a grating pattern may be laminated on the upper surface of the low refractive film LR or formed at the upper surface of the low refractive film LR directly.

In addition, on the rear surface of the high refractive film HR, a reflection layer RE may be deposited covering most of all surfaces excepting areas where the incident pattern CHOE and the reflective pattern RHOE. The reflection layer RE reflects the light which is total-reflected at the interface between the high refractive film HR and the low refractive film LR and goes out from the rear surface of the high refractive film HR, so that the light is return into the high refractive film HR. The rear surface of the high refractive film HR is the interface with the air, so that most light may be total-reflected. However, to reduce light leakage, the reflection layer RE is beneficially disposed at the rear surface of the high refractive film HR.

The base film WG beneficially has a rectangular shape having the surface area corresponding to the shape and size of the flat display panel LCP. At one side of the base film WG, an incident pattern CHOE is disposed for receiving the light from the light source LS. At opposite other side of the base film, a reflective pattern RHOE is disposed. The incident pattern CHOE beneficially faces the light source LS directly. The incident pattern CHOE and the reflective pattern RHOE are beneficially disposed on the rear surface of the base film WG. In other words, they are beneficially attached at one side and opposite side, on the rear surface of the high refractive film HR.

The light source LS may be a point light source such as a LASER or a tiny surface light source such as an LED or LED LASER. In the related art, an LED array is used, in which a plurality of LEDs are arrayed in a line. In such a case, due to the large number of LEDs, there may be heating problem and the energy efficiency may become low.

To address such heating problem and low energy efficiency, the thin film type backlight unit according to an embodiment of the present invention may use a reduced number of light sources. For example, in the first embodiment of the present disclosure, the thin film type backlight unit may include just one white light LED for the light source LS. Alternatively, a red light LED, a green light LED and a blue light LED are arrayed in a vertical, horizontal or triangular direction to form the light source LS so that the light source LS can provide a white light.

For a high luminescent thin film type backlight unit or various other purposes, a plurality of white light LEDs may be used. Alternatively, a plurality of LED sets may be used, wherein one LED set may include a red light LED, a green light LED and a blue light LED. For convenience, the case where one white light LED is used is described as an example.

The light source LS is disposed, facing with the incident pattern CHOE attached at one side of the rear surface of the base film WG. As the light source LS used in the first embodiment is a white light LED, the light from the light source LS is a diffused light (or a spherical light wave). As a result, the light source LS is beneficially spaced apart from the incident pattern CHOE with a focal length of the diffused light, that is, a focal length, f, of the light source LS.

As the light from the light source LS is a diffused light, all points distributed on the incident pattern CHOE may be the light incident points. That is, as the light source LS is not a point light source, there are many light incident points. It may be difficult to form a hologram pattern using a plurality of light incident points. Therefore, a light incident point LI is set where the point is defined as a vertical line from the focus point of the light source LS to the incident pattern CHOE meet the surface of the incident pattern CHOE. The light from the light source LS enters into the light incident point LI. Especially, the light enters into the high refractive film HR along the direction perpendicular to (Z axis direction) the rear surface of the high refractive film HR.

According to an embodiment of the present invention, the number of the light sources LS can be reduced or minimized. The incident pattern CHOE may be disposed as covering whole width of the one side of the base film WG. The incident pattern CHOE has an optimized or minimized width. For portable displays, one light source LS may be enough. However, for large-sized displays such as 30 inch or more TV sets, a plurality of light sources LS may be required for better efficiency. The incident pattern CHOE may serve to expand the light from the point light source as to be corresponding to the width of the reflective pattern RHOE. As a result, considering the efficiency of the light expansion, it may be preferable to select the number of light source LS and to control the size of the incident pattern CHOE.

The incident pattern CHOE receives the light from the light source LS disposed at one side of the base film WS, and sends it to the reflective pattern RHOE disposed at the opposite side of the base film WS. The ultrathin light guide film LGF preferably radiates the backlight with an evenly distributed over the whole surface. Therefore, the incident pattern CHOE expands and/or diffuses the light from the light source LS into the expanded light covering to the width of the base film WG. As a result, it may be preferable that the incident pattern CHOE is a holography pattern in which the light from the light source LS to the light incident point LI is expanded or diffused to the width corresponding to the opposite side.

The light into the incident pattern CHOE is radiated to the opposite side of the base film WG as an expanded light. Especially, the expanded light has a light path of incident angle at which the light is total reflected at the interface between the high refractive film HR and the low refractive film LR. That is, the incident pattern CHOE preferably is a holography pattern by which the light from the light source LS is expanded to the width of opposite side of the base film WG and has an incident angle of total reflection in the high refractive film HR.

The light from the incident pattern CHOE, by the repeated total reflection through the base film WG, travels to the reflective pattern RHOE disposed at the opposite side of the base film WG. The light into the reflective pattern RHOE would be converted into a collimated light distributed over the whole surface of the ultrathin light guide film LGF. As a result, the reflective pattern RHOE is preferable a holography pattern in which the expanded light is converted into a collimated light having a width corresponding to the width of the base film WG.

When the reflected light by the reflective pattern RHOE has the same reflecting angle with the incident angle of total reflection in the high refractive film HR, the total reflection between the high refractive film HR and the low refractive film LR is repeated. As a result, no light may be radiated from the ultrathin light guide film LGF. Therefore, the light from the reflective pattern RHOE has an incident angle at which the total reflection of the interface between the high refractive film HR and the low refractive film LR is broken. As a result, the reflective pattern RHOE is preferable a holography pattern satisfying both the collimation condition and the total reflection breaking condition.

Hereinafter, how the light from the light source LS travels into the ultrathin light guide film LGF, and how the backlight is radiated from the upper surface of the ultrathin light guide film LGF will be described with reference to referring to FIGS. 7 to 10. At first, the light path from the light source LS to the incident pattern CHOE will be described in detail.

Figure 7:
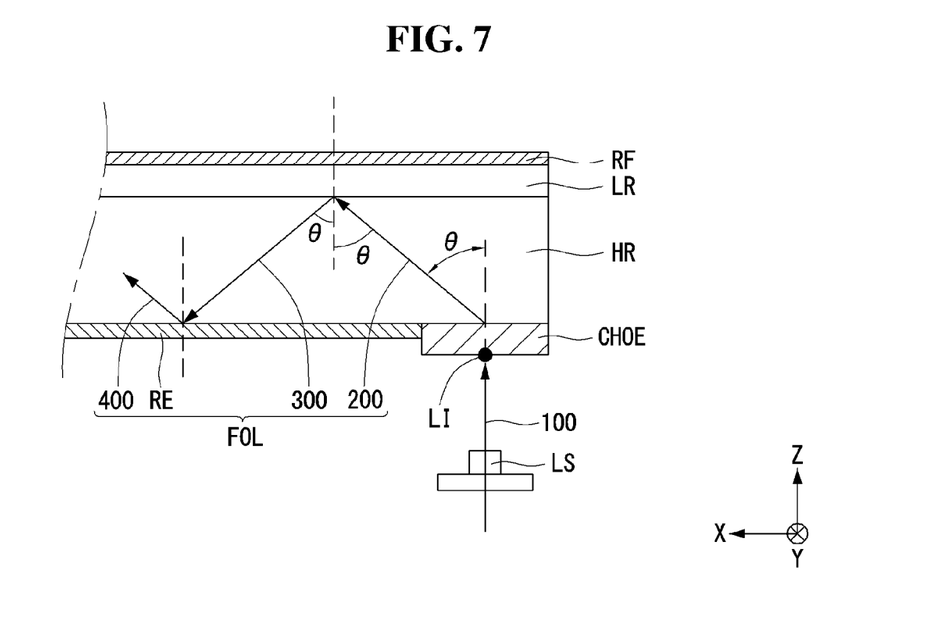
FIG. 7 is an enlarged side view illustrating a light path in which a light entering into an incident pattern is converted into an expanded light in a X-Z plane of an ultrathin light guide film according to the first embodiment of the present invention.
Figure 8:
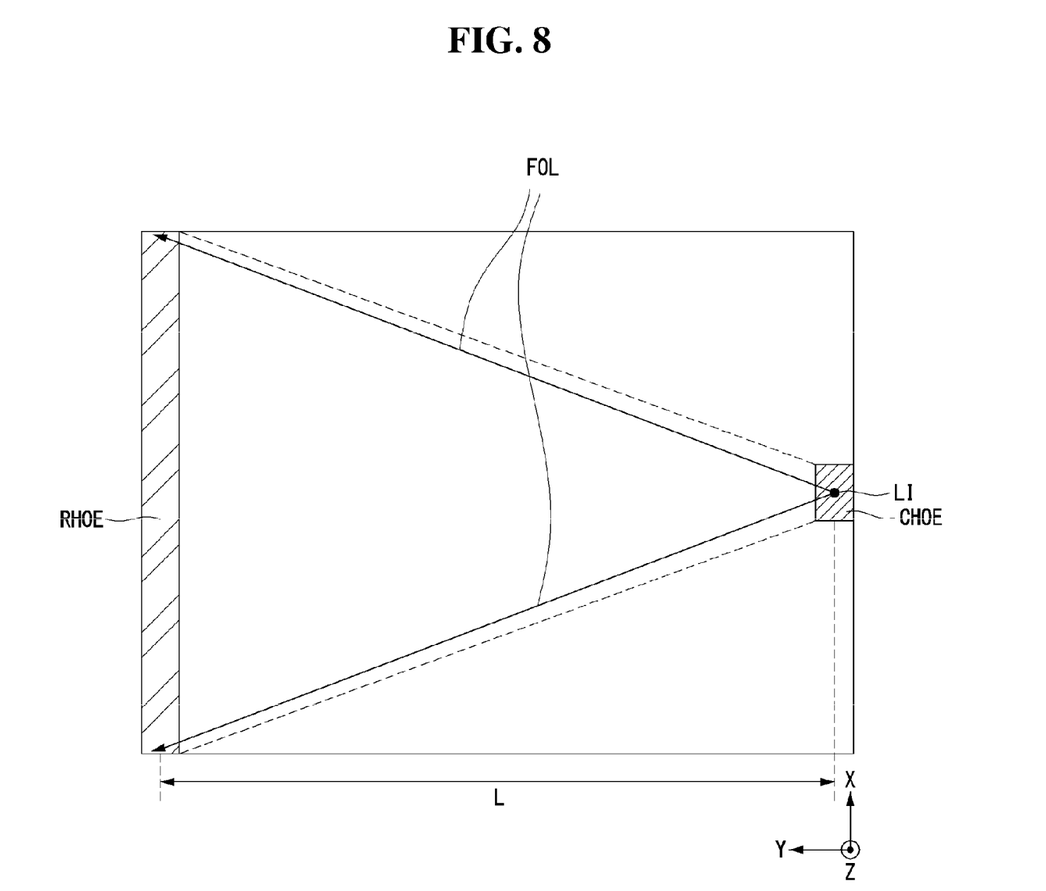
FIG. 8 is a plan view illustrating a light path of the expanded light illustrated in FIG. 7 in a X-Y plane of the ultrathin light guide film according to the first embodiment of the present invention.

FIG. 7 is an enlarged side view illustrating a light path in which a light entering into an incident pattern is converted into an expanded light in a X-Z plane of an ultrathin light guide film according to the first embodiment of the present invention. FIG. 8 is a plan view illustrating a light path of the expanded light illustrated in FIG. 7 in a X-Y plane of the ultrathin light guide film according to the first embodiment of the present invention.

Referring to FIG. 7, an incident light 100 from the light source LS enters into the incident pattern CHOE as being perpendicular to the surface of the incident pattern CHOE along the Z-axis in the X-Z plane. As described above, the light from the light source LS is a spherical light wave. As a result, there are many incident points so that it may be difficult to decide which one is set as the incident light. Here, the incident pattern CHOE is formed using a light which enters perpendicularly onto the incident pattern CHOE from the focal length, f, of the light source LS.

Further, by the holography pattern formed at the incident pattern CHOE, the incident light 100 is refracted into the high refractive film HR which is the lower layer of the base film WG. Here, the refraction angle, θ, of the refracted light 200 is preferably larger than the critical angle of the total reflection, TR, at the interface between the high refractive film HR and the low refractive film LR. That is, the incident pattern CHOE preferably has a holography pattern in which the refraction angle is satisfying the condition of θ>TR$_{atHR-LR}$. For example, the incident pattern CHOE may be a holography optical film writing an interference pattern using the incident light 100 as a reference beam and the refracted light 200 as an objective beam.

In other words, the incident pattern CHOE is a holography pattern formed by using a spherical light wave having a focal length, f, and a spherical light having an incident angle the same with a refraction angle, θ, from the rear (or bottom) surface of the ultrathin light guide film LGF. Alternatively, the incident pattern CHOE is a holography pattern formed by using a spherical light wave having a focal length, f, and a spherical light having an incident angle the same with a refraction angle, θ, from the rear (or bottom) surface of the ultrathin light guide film LGF having the incident pattern CHOE.

As a result, on the X-Z plane, the incident light 100 is converted into the refracted light 200 and then enters into the high refractive film HR. The refracted light 200 is reflected at the upper surface of the high refractive film HR and then travels again into the high refractive film HR as a total reflection light 300. The total reflection light 300 is reflected by the reflection layer RE and then travels again into the high refractive film HR as a reflected light 400. Similarly, the incident light 100 is converted into an expanded light FOL and travels to the reflective pattern RHOE disposed at the opposite side.

Figure 9:
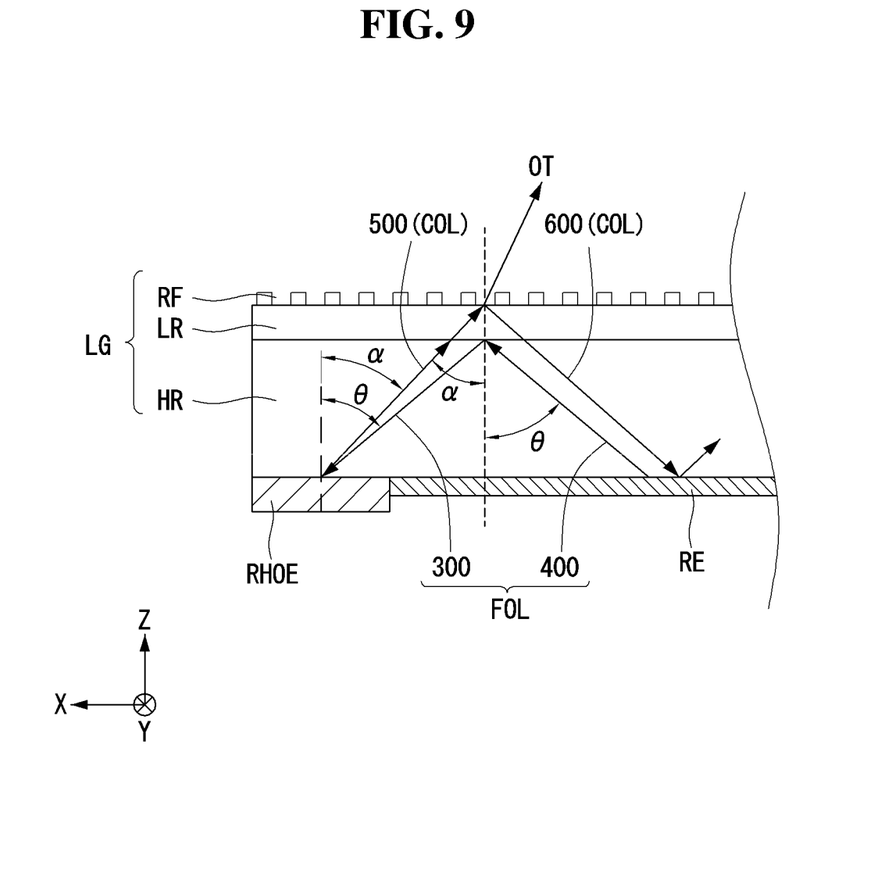
FIG. 9 is an enlarged side view illustrating a light path in which an expanded light entering into a reflection pattern is converted into a collimated light in a X-Z plane of an ultrathin light guide film, and is emitted from an upper surface of the ultrathin light guide film according to an embodiment of the present invention.

Form the view of a X-Y plane, which is illustrated in FIG. 9, the incident light 100 which enters onto the light incident point LI of the incident pattern CHOE disposed at one side of the ultrathin light guide film LGF travels to the reflective pattern RHOE as the expanded light FOL. For example, the incident light 100 may be a spherical light wave radiated from the light source LS such as an LED. By the holography diffraction pattern written on the incident pattern CHOE, the incident light 100 may become the expanded light FOL, a plane light wave, expanded and/or diffused in accordance with the width of the reflective pattern RHOE disposed at the distance L from the one side to the opposite side. The dotted line in FIG. 9 means that the light perpendicularly entering at any point onto the incident pattern CHOE is expanded corresponding to the reflective pattern RHOE.

As a result, the holography diffraction pattern written on the incident pattern CHOE may satisfy the total reflection condition at the interface between the high reflective film HR and the low reflective film LR for the spherical light wave, and convert the special light wave into a plane light wave expanded and/or diffused to the width of the reflective pattern RHOE. For example, the diffractive pattern written on the incident pattern CHOE may be an interference pattern formed using the spherical light wave from the LED along the Z axis as a reference beam and the expanded light FOL having an incident angle, θ, to the Z axis and expanded to the reflective pattern RHOE apart from distance, L, from the one side to the opposite side as an objective beam.

Figure 10:
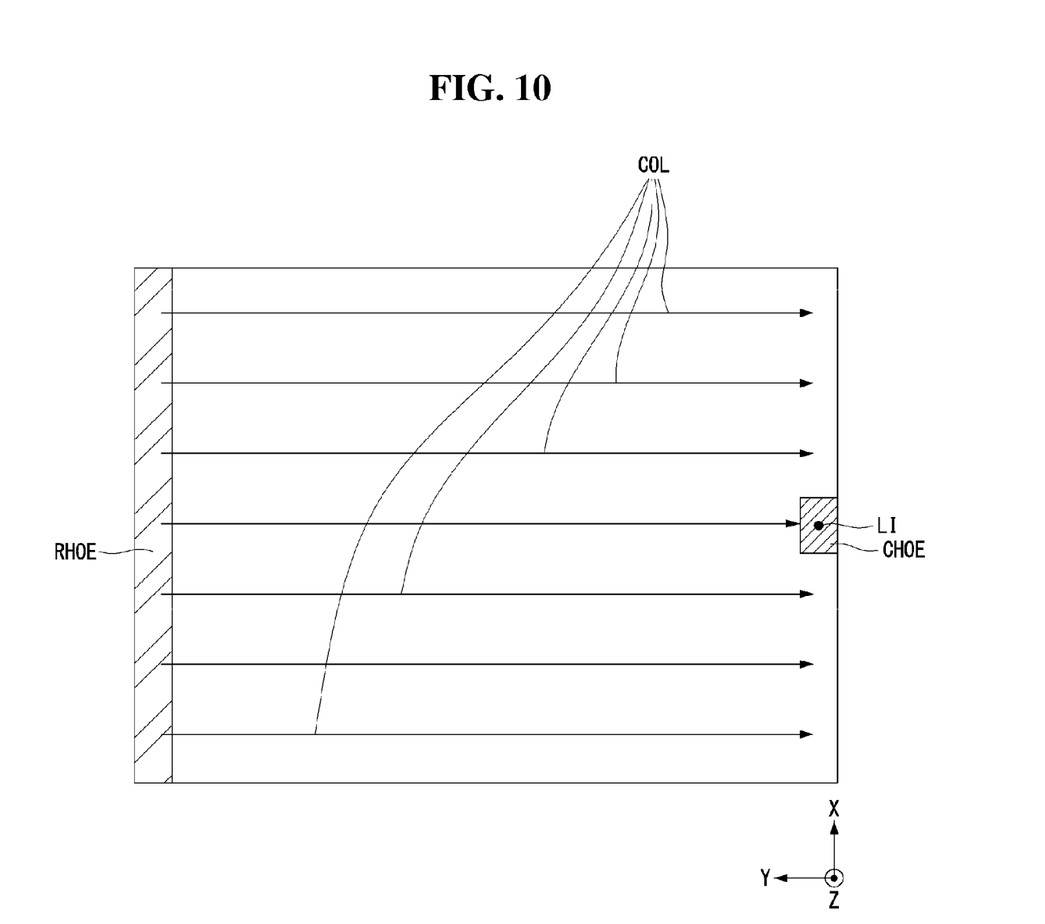
FIG. 10 is a plan view illustrating a light path of a collimated light in a X-Y plane of an ultrathin light guide film according to an embodiment of the present invention.

Hereinafter, light path associated with the reflective pattern RHOE will be described in detail with reference to FIGS. 9 to 10.

FIG. 9 is an enlarged side view illustrating a light path in which an expanded light entering into a reflection pattern is converted into a collimated light in a X-Z plane of a ultrathin light guide film, and is emitted from an upper surface of the ultrathin light guide film. FIG. 10 is a plan view illustrating a light path of a collimated light in a X-Y plane of the ultrathin light guide film.

Referring to FIG. 9, the expanded light FOL enters onto the reflective pattern RHOE through the high refractive film HR. In detail, the reflected light 400 by the reflection layer RE disposed under the high refractive film HR travels to the top surface of the high refractive film HR. Then, it turns into the total reflected light 300 and then enters into the high refractive film HR. It enters onto the upper surface of the reflective pattern RHOE. Here, the incident angle of the expanded light FOL into the reflective pattern RHOE is larger than the critical angle for the total reflection at the interface between the high refractive film HR and the low refractive film LR. That is the incident angle of the expanded light FOL is the same with the reflection angle, θ, of the total reflected light 300.

The total reflected light 300 entering onto the reflective pattern RHOE is converted into a re-reflected light 500 by the diffraction optical pattern written on the reflective pattern RHOE and then travels back into the high refractive film HR. Here, the re-reflected angle, α, is less than the total reflection angle of the interface between the high refractive film HR and the low refractive film LR. As a result, the re-reflected light 500 is emitted from the high refractive film HR. The total reflection condition at the interface between the high refractive film HR and the low refractive film LR is broken. Therefore, some of the re-reflected light 500 are refracted into the low refractive film LR, others are reflected into the high refractive film HR. Here, it is preferable that the re-reflected angle, α, is larger than the critical angle for total reflection at the upper surface of the low refractive film LR.

That is, the reflective pattern RHOE is preferable a holography pattern satisfying the condition of $TR_{atLR\text{-}air} < \alpha < TR_{atHR\text{-}LR}$. For example, the reflective pattern RHOE is a holography film having an interference pattern written with the total reflected light 300 as a reference beam and the re-reflected light 500 as an objective beam.

From the view of X-Z plane, the total reflected light 300 is converted into the re-reflected light 500 by the reflective pattern RHOE and then travels into the high refractive film HR. The re-reflected light 500 is refracted or reflected at the upper surface of the high refractive film HR so that some enter into the low refractive film LR and others enter into the high refractive film HR. In fact, very complex optical phenomena may occur at the upper surface of the high refractive film HR. For convenience of explanation, it is explained that the total reflection is broken at the upper surface of the high refractive film HR and all light travels into the low refractive film LR. Further, the all light travelling into the low refractive film LR is actually refracted, but in figures the refracted light path is not shown, because the refracted angle has no important meaning when the thickness of the low refractive film LR is very thin.

The re-reflected light 500 again entering into the low refractive film LR is converted as a re-entering light 600. The re-reflected light 500 is total reflected at the upper surface of the low refractive film LR, the interface between the low refractive film LR and the air. Of course, the re-entering light 600 is refracted and reflected at the interface between the high refractive film HR and the low refractive film LR. Here, for convenience, the re-entering light 600 is illustrated as entering into the high refractive film HR.

That is, the re-reflected light 500 by the reflective pattern RHOE is total reflected at the upper surface of the low refractive film LR and then converted into the re-entering light 600 entering into the low refractive film LR and the high refractive film HR. After that, the re-entering light 600 is again reflected by the bottom surface of the high refractive film HR and then is converted into the re-reflected light 500. Consequently, the re-reflected light 500 travels to the one side from the opposite side. By doing so, the light reflected by the reflective pattern RHOE is propagated to the one side where the light source LS is disposed.

During the above described processes, for the case that a light radiating pattern RF such as a grating pattern is disposed on the upper surface of the low refractive film LR, some of the re-reflected light 500 are total reflected by the upper surface of the low refractive film LR and others of the re-reflected light 500 proportional to the diffractive efficiency of the light radiating pattern RF travel out from the low refractive film LR so that they are radiated to the flat display panel LCP as the backlight OT. For example, when the diffractive efficiency of the light radiating pattern RF is 5%, the 5% of the re-reflected light 500 would be the backlight OT radiated outside of the ultrathin light guide film LGF. The 95% of the re-reflected light 500 would be total reflected as the re-entering light 600 and then travels back into the ultrathin light guide film LGF. Next, among 95% of the re-reflected light 500, the 5% would be the backlight OT radiated outside of the ultrathin light guide film LGF, and 95% would travel back into the ultrathin light guide film LGF. Repeating these processes, the backlight OT is radiated from the upper surface of the ultrathin light guide film LGF.

Further, it is preferable that the light radiating pattern RF is a holography pattern by which the backlight OT is vertically radiated to the surface of the ultrathin light guide film LGF. As illustrated in FIG. 9, the re-reflected light 500 has an incident angle to the Z axis and travels out from the upper surface of the low refractive film LR. Here, the holography pattern makes the radiating direction of the backlight OT close to the Z axis as possible. For the case that the light radiating pattern RF is a grating pattern, the material for the grating pattern would have characteristics for making the radiating direction of the backlight OT close to the Z axis.

Further, the re-reflected light 500 and the re-entering light 600 propagate through the ultrathin light guide film LGF as collimated lights. For example, as illustrated in FIG. 10, on the X-Y plane, the reflected light by the reflective pattern RHOE is preferably a collimated light COL propagating from the opposite side to the one side of the ultrathin light guide film LGF.

As a result, the holography pattern written on the reflective pattern RHOE includes a diffraction pattern by which the expanded light FOL is total reflected at the interface between the low refractive film LR and the air, and is converted into a collimated light covering the width of the ultrathin light guide film LGF. For example, the diffraction pattern written on the reflective pattern RHOE may be an interference pattern using the expanded light FOL as a reference beam and the collimated light COL as an objective light. Here, the expanded light FOL is expanded as corresponding to the width of the reflective pattern RHOE and has an incident angle of θ, and the collimated light COL has a refraction angle of a to the Z axis and covers the width of the ultrathin light guide film LGF (or reflective pattern RHOE).

According to the first embodiment, the wavelength of the white light from the light source is not considered. Actually, when white lights are radiated from the light source, the wavelength of the lights which can be refracted by the incident pattern CHOE is restricted. That is, it may be difficult to make a holography pattern refracting all wavelengths of the white light. Therefore, the holography pattern of the incident pattern CHOE is for some range of wavelength among all spectrum ranges of the white light. This means that the light efficiency is low.

Hereinafter, a flat panel display including a thin film type backlight unit according to the second embodiment of the present will be described, in which light efficiency is enhanced, with reference to FIG. 11.

Figure 11:
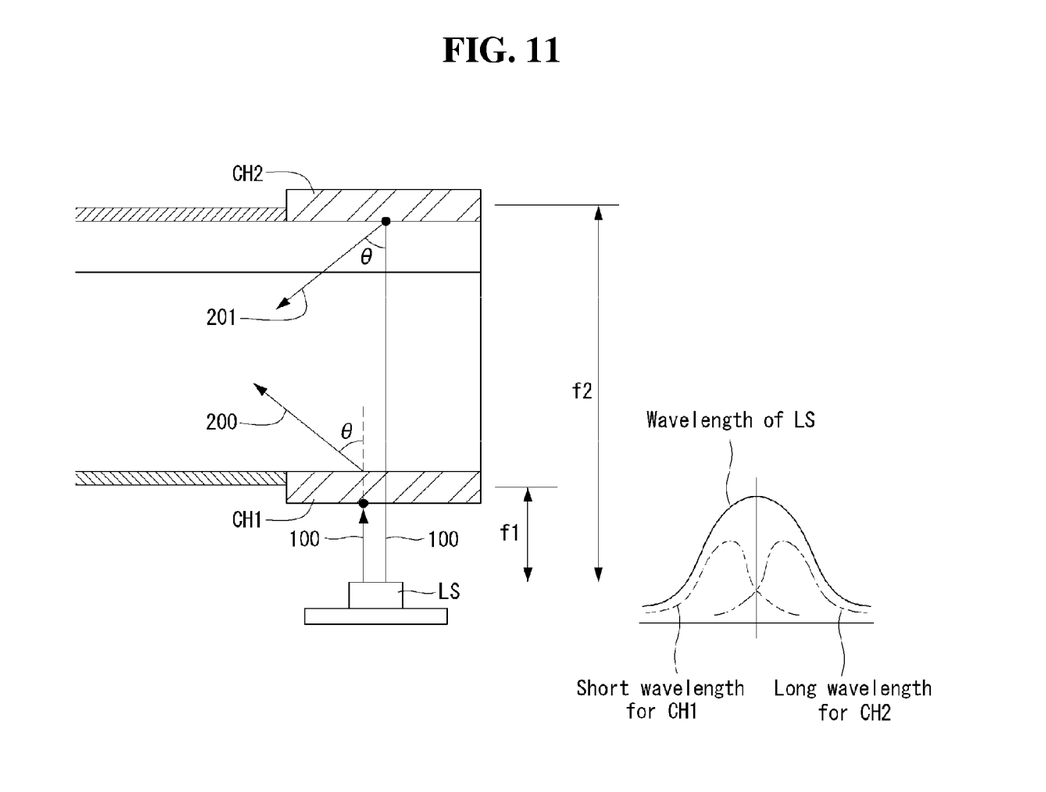
FIG. 11 is an enlarged cross-sectional view illustrating a thin film type backlight unit according to the second embodiment of the present invention.

FIG. 11 is an enlarged cross-sectional view illustrating a thin film type backlight unit according to the second embodiment of the present invention.

The backlight unit according to the second embodiment has a very similar structure to the backlight unit according to the first embodiment. The difference is in the structure of the incident pattern. In detail, the backlight unit according to the second embodiment includes a first incident pattern CH1 closely disposed to the light source LS and a second incident pattern CH2 far-off from the light source LS.

The incident patterns CH1 and CH2 are to enhance light efficiency. For example, the light from the light source LS may have the wavelength spectrum as indicated by a solid line in FIG. 11. In order to use all ranges of wavelength as the backlight, the first incident pattern CH1 is a holography pattern using the light of a short wavelength range. Further, the second incident pattern CH2 a holography pattern using the light of a long wavelength range.

The light of the short wavelength entering onto the first incident pattern CH1 is refracted in the same manner as described in the first embodiment so that it propagates into the ultrathin light guide film LGF. On the other hand, the light of the long wavelength entering onto the second incident pattern CH2 is reflected with a reflection angle so that it propagates into the ultrathin light guide film LGF. The reflected light by the second incident pattern CH2 may act as the total reflected light 300 at the upper surface of the high refractive film HR and travels into the high refractive film HR, as described in the first embodiment.

Referring to FIG. 11, the incident light 100 from the light source LS perpendicularly enters onto the first incident pattern CH1 and the second incident pattern CH2 along the Z axis on the X-Z plane. As described above, the light from the light source LS may be a spherical light wave, a diffused light. As a result, there are many incident points so that it may be difficult to decide which one is set as the incident light. Here, the light perpendicularly enters onto the first incident pattern CH1 from the first focal length, f1, and the light perpendicularly enters onto the second incident pattern CH2 from the second focal length, f2, of the light source LS. The first incident pattern CH1 is disposed on the bottom surface of the base film WG and the second incident pattern CH2 is disposed on the top surface of the base film WG. Therefore, the difference between the first focal length, f1, and the second focal length, f2, is corresponding to the thickness of the base film WG.

By the holography pattern written on the first incident pattern CH1, the incident light 100 is refracted into the high refractive film HR. Also, by the holography pattern written on the second incident pattern CH2, the incident light 100 is reflected into the high refractive film HR. Here, the refracted light 200 preferably has a refraction angle, θ, larger than the critical angle for the total reflection at the interface between the high refractive film HR and the low refractive film LR. Further, the reflected light 201 has a reflection angle that is preferably the same as the refraction angle, θ. That is, it is preferable that the first incident pattern CH1 has a holography pattern satisfying the refraction angle condition of θ>$TR_{atHR-LR}$. For example, the first incident pattern CH1 is an interference pattern using the incident light 100 as a reference beam and the refracted light 200 as an objective light. Similarly, the second incident pattern CH2 is an interference pattern using the incident light 100 as a reference beam and the reflected light 201 as an objective light.

In other word, the first incident pattern CH1 is a holography pattern formed using a spherical light wave having the first focal length, f1, and a plane light wave propagating with the refraction angle, θ, at the bottom surface of the ultrathin light guide film LGF. The second incident pattern CH2 is a holography pattern formed using a spherical light wave having the second focal length, f2, and a plane light wave propagating with the reflection angle, θ.

As a result, from the view of the X-Z plane, the incident light 100 enters into the high refractive film HR as the refracted light 200 by the first incident pattern CH1. The refracted light 200 is reflected into the high refractive film HR at the upper surface of the high refractive film HR as the total reflection light 300. The total reflection light 300 is reflected by the reflection layer RE attached on the bottom surface of the high refractive film HR as the reflected light 400. Similarly, the incident light 100 propagates to the opposite side where the reflective pattern RHOE is disposed as the expanded light FOL.

Further, the incident light 100 enters into the high refractive film HR as the reflected light 201 by the second incident pattern CH2. The reflected light 201 is reflected by the reflection layer RE attached on the bottom surface of the high refractive film HR as the reflected light 400. The reflected light 400 is reflected into the high refractive film HR at the upper surface of the high refractive film HR as the total reflection light 300. Similarly, the incident light 100 propagates to the opposite side where the reflective pattern RHOE is disposed as the expanded light FOL.

After that, by the reflective pattern RHOE, the light is collimated over a whole surface of the ultrathin light guide film LGF, and then the backlight OT radiated from upper surface of the ultrathin light guide film LGF. These processes are similar to the processes described with respect to the first embodiment.

According to the first and the second embodiments of the present invention, the holography pattern is formed using a spherical light wave and a plane light wave. This is for a LED light source which provides a spherical light wave. That is, the descriptions are focused on that the incident pattern receives a spherical light wave and then provides a plane light wave to the reflective pattern. However, the present invention is not limited thereto. For example, the light source may provide any one of a spherical light wave or plane light wave. Also, the light from the incident pattern may be any one of a spherical light wave or plane light wave.

The thin film type backlight unit according to the first and the second embodiments of the present invention includes a reduced or minimum number of light sources LS. Further, the high refractive film HR and the low refractive film LR are stacked. The diffraction film of the incident pattern CHOE is disposed on one side and the diffraction film of the reflective pattern RHOE is disposed on the opposite side. Further, the light source LS is disposed under the ultrathin light guide film LGF. As a result, the thickness of the backlight unit can be reduced or minimized. Most elements of the backlight unit is made in a film type, so that it can be easily applied to a flexible flat panel display.

As the diverging angle of the incident light can be controlled by a holography pattern of the incident pattern, it may be easier to develop a narrow bezel display. Further, as most elements included in the backlight unit are a film type, the backlight unit can be manufactured in a roll-to-roll type, which can simplify the manufacturing process with reduced manufacturing cost.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flat panel display device having a display panel and a back light unit, the back light unit comprising:
    a base film having a width and a length and including a high refractive film and a low refractive film on the high refractive film;
    a first incident pattern at a one side of a first surface of the base film;
    a reflective pattern on the first surface of the base film at an opposite side from the one side having the first incident pattern, wherein a distance between the first incident pattern and the reflective pattern is substantially equal to the length of the first surface of the base film, and wherein a length of the reflective pattern is substantially equal to the width of the first surface of the base film;
    a light radiating pattern on a second surface of the base film; and
    a light source spaced apart from the first incident pattern with a first focal length and providing an incident light to the first incident pattern.

2. The device according to the claim 1, further comprising:
    a reflection layer covering the first surface of the base film excluding the incident pattern and the reflective pattern.

3. The device according to the claim 1, wherein the first incident pattern includes a holography pattern that converts the incident light into an expanded light,
    wherein the incident light perpendicularly enters onto a surface of the incident pattern, and
    wherein the expanded light has a refraction angle greater than a critical angle for total reflection at an interface between the high refractive film and the low refractive film, and is expanded substantially corresponding to the width.

4. The device according to the claim 3, wherein the expanded light propagates to the reflective pattern through the high refractive film.

5. The device according to the claim 4, wherein the reflective pattern includes a holography pattern that converts the expanded light into a collimated light which has a reflection angle smaller than the refraction angle and greater than a critical angle of total reflection at an interface between the low refraction film and an air, and covers the width.

6. The device according to the claim 5, wherein a portion of the collimated light is refracted by the light radiating pattern in a substantially perpendicular direction to the second surface of the base film, and is radiated outward from the low refractive film.

7. The device according to the claim 1, further comprising:
    a second incident pattern on the second surface of the base film, facing the first incident pattern,
    wherein the light source is spaced apart from the second incident pattern with a second focal length, and provides the incident light to the second incident pattern.

8. The device according to the claim 7, wherein the first incident pattern is a holography pattern made with a short wavelength light of the incident light, and
    wherein the second incident pattern is a holography pattern made with a long wavelength light of the incident light.

9. The device according to the claim 7, wherein a distance difference between the first focal length and the second focal length substantially corresponds to a thickness of the base film.

* * * * *